United States Patent
Murrish et al.

(10) Patent No.: US 7,099,725 B2
(45) Date of Patent: Aug. 29, 2006

(54) ALTERNATE PLY REPRESENTATION FOR COMPOSITE DESIGN AND MANUFACTURING

(75) Inventors: Richard E. Murrish, Wichita, KS (US); Christopher T. Hanson, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 29 days.

(21) Appl. No.: 10/726,178

(22) Filed: Dec. 2, 2003

(65) Prior Publication Data
US 2005/0119774 A1    Jun. 2, 2005

(51) Int. Cl.
*G06F 19/00* (2006.01)
(52) U.S. Cl. .................. 700/98; 700/118; 700/182
(58) Field of Classification Search ............ 700/182, 700/95, 98, 118–120; 156/89.11, 166, 433; 703/6
See application file for complete search history.

(56) References Cited

U.S. PATENT DOCUMENTS

| | | | |
|---|---|---|---|
| 5,006,990 A | | 4/1991 | Ward et al. |
| 5,779,833 A | * | 7/1998 | Cawley et al. ............ 156/89.11 |
| 5,914,002 A | * | 6/1999 | Cahuzac ..................... 156/166 |
| 5,936,861 A | * | 8/1999 | Jang et al. ..................... 700/98 |
| 6,341,261 B1 | * | 1/2002 | Vasey-Glandon et al. ...... 703/6 |
| 6,718,218 B1 | * | 4/2004 | Matheson .................... 700/95 |
| 6,843,565 B1 | * | 1/2005 | Evans et al. .................. 353/28 |

FOREIGN PATENT DOCUMENTS

EP     0 416 568 A2     9/1990

OTHER PUBLICATIONS

Guillermin et al., "Advanced CAD Software Tools For Cost-Effective Composite Engineering," XP008046006, Composite Design Technologies, Inc., 46th Int'l SAMPE Symposium, May 6-10, 2001.
Henson et al., "Advanced Tools For Rapid Development Of Reduced Complexity Composite Structures," XP008046016, AIAA-2002-1764, Lockheed Martin Corporation, 2002.

* cited by examiner

*Primary Examiner*—Leo Picard
*Assistant Examiner*—Steven R. Garland
(74) *Attorney, Agent, or Firm*—Harness Dickey & Pierce P.L.C.

(57) ABSTRACT

A three dimensional computer aided design (CAD) model of a composite part which includes a plurality of plies including tool side ply(s), and bag side ply(s) is provided. The composite part is formed on a tool. The model includes a first CAD native surface representative of the shape of the tool, a second CAD native shape representative of an excess ply material and made from the first shape, and a third CAD native shape representative of the bag side ply(s) and adjacent to the joined first and second shapes. In particular, the CAD native shapes used to represent the ply(s) may be trims of a surface.

21 Claims, 9 Drawing Sheets

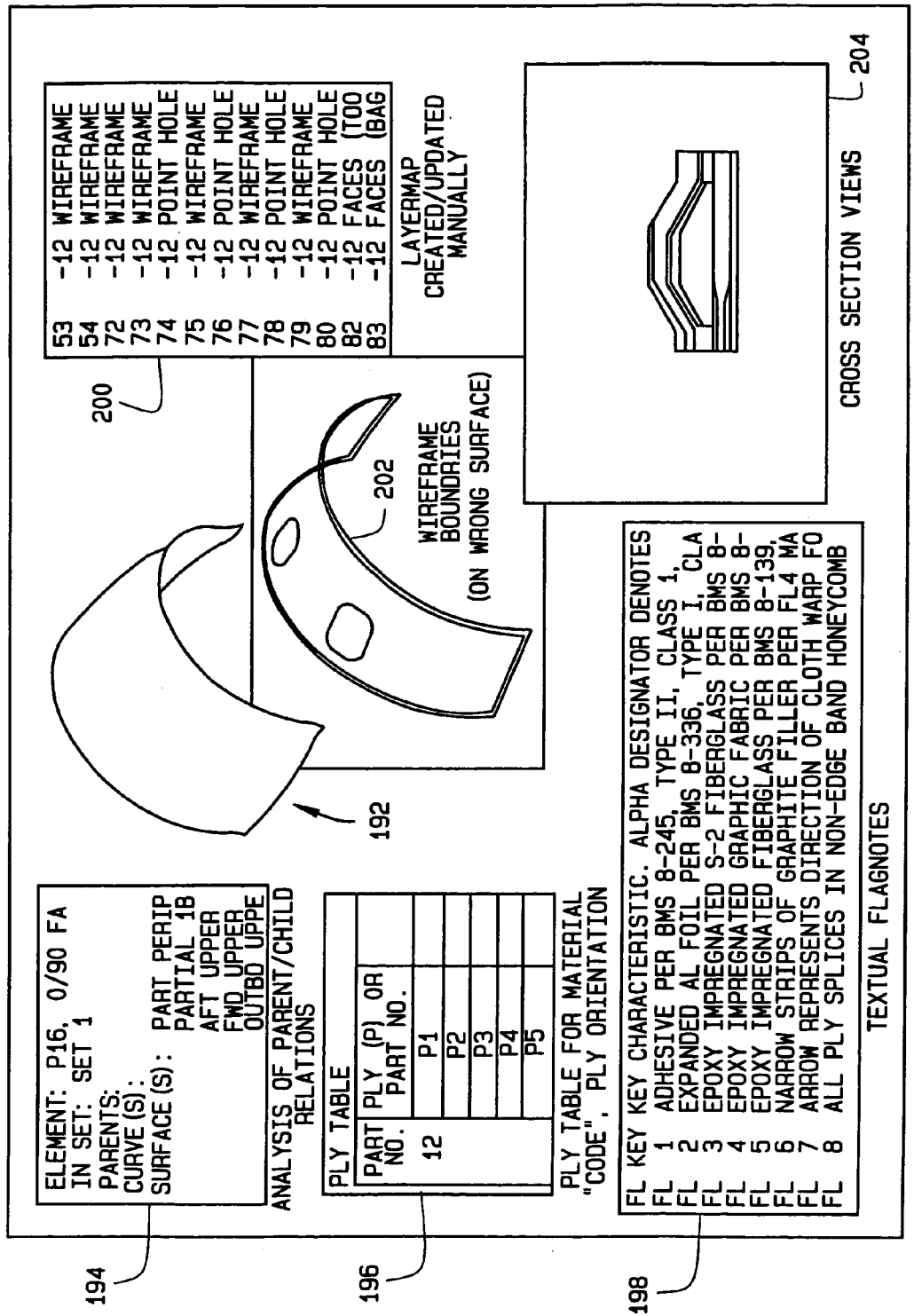

ALTERNATE PLY REPRESENTATION FOR COMPOSITE DESIGN AND MANUFACTURING

FIELD OF THE INVENTION

The present invention relates to the modeling of products with CAD (Computer Aided Design) software, and more particularly to the 3-D modeling of composite structures.

BACKGROUND OF THE INVENTION

Large product development projects require the sharing of product design information among many diverse team members. These team members include prime contractor management, engineers, designers, and manufacturing personnel. Additionally, one or more subcontractors may require access to the design information.

Development of the product may occur in many different locations. For instance, the top-level design may be performed at the prime contractor's facility with the various lower level parts of the product being designed at the subcontractors' facilities. Moreover, manufacturing of the lower level parts may occur at another location with top-level assembly occurring at yet another location. At any of these locations, project personnel may require access to design information to perform their duties.

The assembled product may be shipped to another location for testing after which it is sold and placed in operation. Highly mobile products, such as aircraft, may additionally operate over large regions, throughout which operations, maintenance, and repair activity may necessitate instantaneous access to design information. Since customers and operational experience may provide feedback to the design team, the term "development" herein includes all phases of a product's life. Thus, it has long been felt necessary to provide access to design information at many independent locations that may be separated by significant distances.

Hindering the ability to share design information, many supplementary or task specific CAD applications incorporate proprietary data structures that may only be accessed via expensive licenses. Thus, only those project personnel with licensed copies of the supplemental CAD application may access the design information. In the alternative, applications have become available which are known as low-end viewers. Low-end viewers enable personnel to access design information stored in a format native to a foundation CAD product. Advantageously, low end viewers are less expensive to license and buy than design type products and are compatible with personal computers which are much less expensive than the CAD workstations which would otherwise be required for design access.

However, the presence of the proprietary data structures hides certain design information from low-end viewers. Worse yet, some of the proprietary data structures used by supplemental CAD packages specifically relate to the design information of composite parts.

Since commercial requirements are increasingly demanding the use of composite parts, the use of these proprietary data structures hinders the development of many commercially lucrative products. Accordingly, it would be desirable to provide tools and methods to develop composite parts with CAD applications while allowing low-end viewers at any project location full access to design information regarding the composite part.

SUMMARY OF THE INVENTION

The present invention is directed toward a method of representing a composite part in three dimensions with a format that is native to the foundation computer aided design (CAD) applications. CAD native geometric manipulation is used to form a surface representative of the tool on which the composite part will be formed. Other CAD native surfaces or sheet solids are used to represent the plies that make up layers of the composite part.

In preferred embodiments of the present invention, properties may be associated directly with a surface representing a particular ply or within the same "collector" construct used for the particular CAD package. These associated properties may represent attributes such as the material or orientation of the ply. Additionally, the model may include stacking order constructs to define the relative positioning of composite components such as plies and core. Likewise, design intent, such as parametric constraints and history, may be included in the model.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein:

FIG. 13 is a pictorial view of an incomplete model associated with a previous design process.

DETAILED DESCRIPTION OF THE PREFERRED EMBODIMENTS

Figure 1:
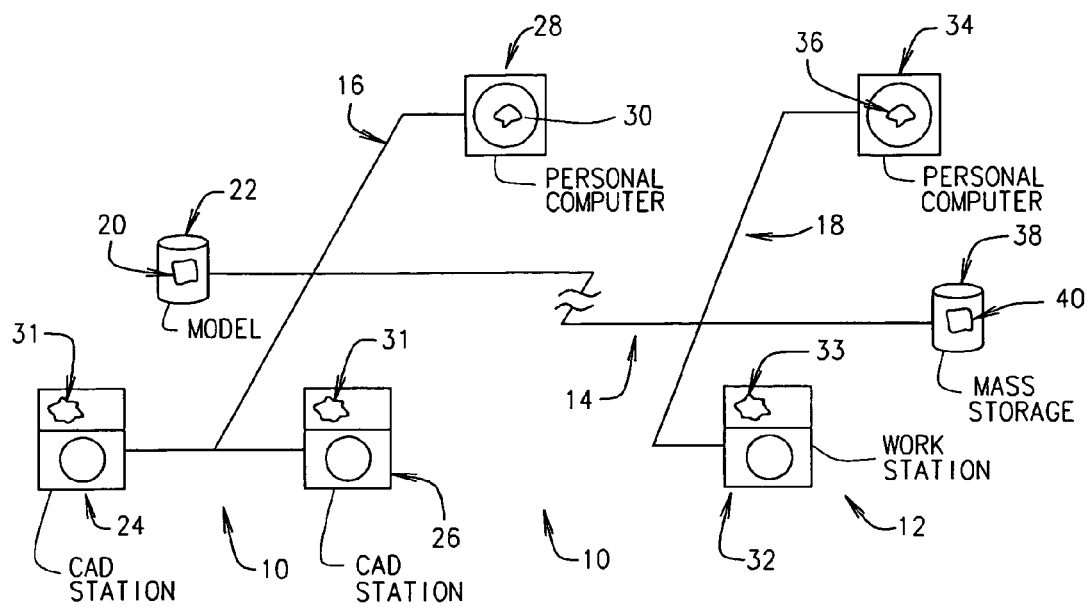
FIG. 1 is a schematic view of a computer network within which the present invention may be used.

The following description of the preferred embodiment(s) is merely exemplary in nature and is in no way intended to limit the invention, its application, or uses.

Previously, wire frame Computer Aided Design (CAD) technology allowed modeling of only the edges of the part being modeled. Wire frame models offered no tools for designing, visualizing or otherwise developing, the surfaces or interior volume of parts. With the advent of surface modeling CAD applications, tools became available to create designs that are more explicit.

Furthermore, with explicit representations, design reviewers who are neither CAD proficient nor technical may fully participate in reviewing the design. Previously, their inability to visualize the part from the limited two-dimensional drawings available prevented them from forming their opinions regarding the design. Thus, three-dimensional surface and solid modeling generally improves the quality of a design and correspondingly reduces development costs. Three-dimensional CAD geometry. including surfaces, shells or shell solids, can be termed as CAD native geometric shapes.

Moreover, because composites offer great flexibility in shaping complex parts subject to demanding service environments, providing tools to completely model composite parts is highly desired. Likewise, because manufacturing composite parts entails significant expenditures, improving the manufacturability of the design of composite parts is also desirable.

Accordingly, the present invention provides a data structure with which to model composite plies that may be used in conjunction with other modeling techniques in order to express the design intent. Since the present invention accomplishes this without the use of proprietary data structures hidden from low-end viewers, manufacturing personnel at remote sites may also access designs modeled in accordance with the present invention.

In describing the present invention, several definitions will aid in the understanding of the present invention. These definitions will be set forth here at the beginning of the description of the invention.

First, a model is a mathematical representation of a part. The model may be of a single part, a component of the part, or even a higher-level assembly. Models are usually created with the aid of a CAD software package and are stored as computer files. Many different file formats are available. For instance, CATIA (available from IBM of White Plains, N.Y.) and Unigraphics (available from EDS of Plano, Tex.) represent a few of the many CAD packages available.

Design intent includes information important to the design but not necessarily embodied in the model. For instance, a design requirement for two surfaces to remain parallel would not necessarily be included in the design geometry. Though, the fact that the two surfaces are parallel could be readily observed. However, if during the course of the design the length of one of the members connecting the two surfaces were to change, the surfaces might skew from being parallel. Thus, without the capture of this piece of design intent, errors might occur.

Also useful for an understanding of the present invention, the environment in which the present invention may be used merits some attention. The present invention will generally be used by a far-flung product development team as illustrated in FIG. 1. For instance, a prime contractor 10 at one location will contract with a specialty subcontractor 12 to aid in the development of the product. Between the prime contractor 10 and the subcontractor 12 a computer connection may be establish via the internet 14 or other computer network. The computer connection 14 allows devices on the prime contractor's intranet 16 to communicate with devices on the subcontractor's intranet 18.

At the prime contractor's location, an assembly model 20 may be stored on a mass storage device 22. Designers working on the model 20 on CAD stations 24 and 26 access the model via the intranet 16. Per the CAD application licensing agreement, the CAD terminals have licenses 31 to use the CAD application. In contrast, a personal computer 28 at the prime contractor's location may not have a license 23. Instead, the personal computer has a low-end viewer 30. On the personal computer 28 other development team members may view the model via the low-end viewer 30.

A similar system exists at the sub contractor's 12 location using work station 32 with license 33; personal computer 34 with low end viewer 36; mass storage device 38 storing model 40; and an intranet 18 to allow communication between these devices. The primary difference between the model 20 and the model 40 is that the model 20 is typically a higher-level assembly model, whereas the model 40 is a model of a detail part. Of course, the model 40 could be the assembly model and model 20 could be the detail model. Indeed, taken together the two models are an integrated model of the entire product. Also, either model may include models of composite parts. Regardless of the choice of which model is the assembly, a team member at any of the devices may obtain detailed design information regarding even the composite part(s) from the models 20 and 40.

Figure 3A:
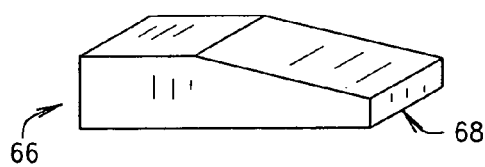
FIG. 3A is a perspective view of a composite part being modeled in accordance with the method of FIG. 2.
Figure 3D:
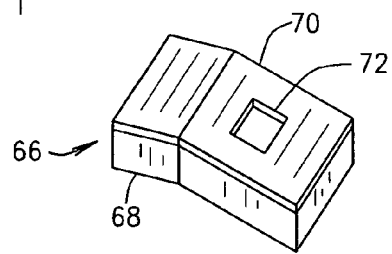
FIG. 3D is a perspective view of a fourth step in modeling the composite part of FIG. 3A.
Figure 3B:
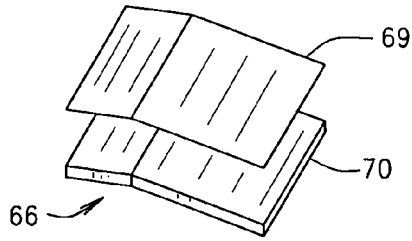
FIG. 3B is a perspective view of a second step in modeling the composite part of FIG. 3A.
Figure 3E:
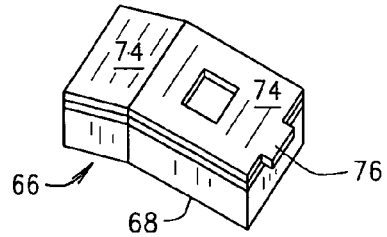
FIG. 3E is a perspective view of a fifth step in modeling the composite part of FIG. 3A.
Figure 3C:
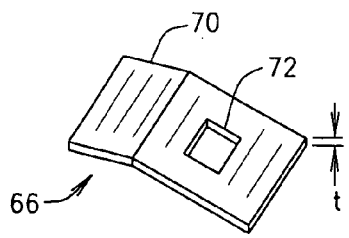
FIG. 3C is a perspective view of a third step in modeling the composite part of FIG. 3A.

Turning now to FIGS. 2, 3A, 3B, 3C, 3D, 3E and 3F, a flowchart depicting a design method 41 for composite parts, in accordance with a preferred embodiment of the present invention, is illustrated along with a generic composite part being modeled. Within an available CAD application the designer models the overall part surface 68 for the composite part as in operation 42 (illustrated in FIG. 3A). Then the designer extracts a tool surface 69 in operation 44 as shown in FIG. 3B. Next, as desired, the designer adds excess to the tool surface (not shown) to the model 66 as illustrated in FIG. 3C. See operation 46. The excess surface is desirable to ensure that the laminate ply (to be subsequently modeled) has excess material for manufacturing convenience. A stacking order for the plies in the composite part is assumed to be available in operation 47; this stack lists the number, material, and orientation of each ply.

Figure 3F:
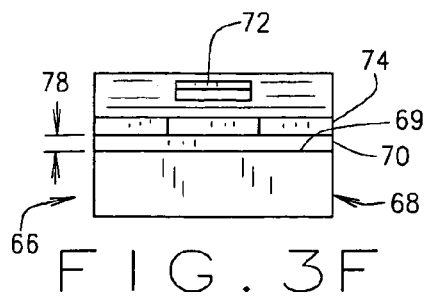
FIG. 3F is a perspective view of a sixth step in modeling the composite part of FIG. 3A.
Figure 2:
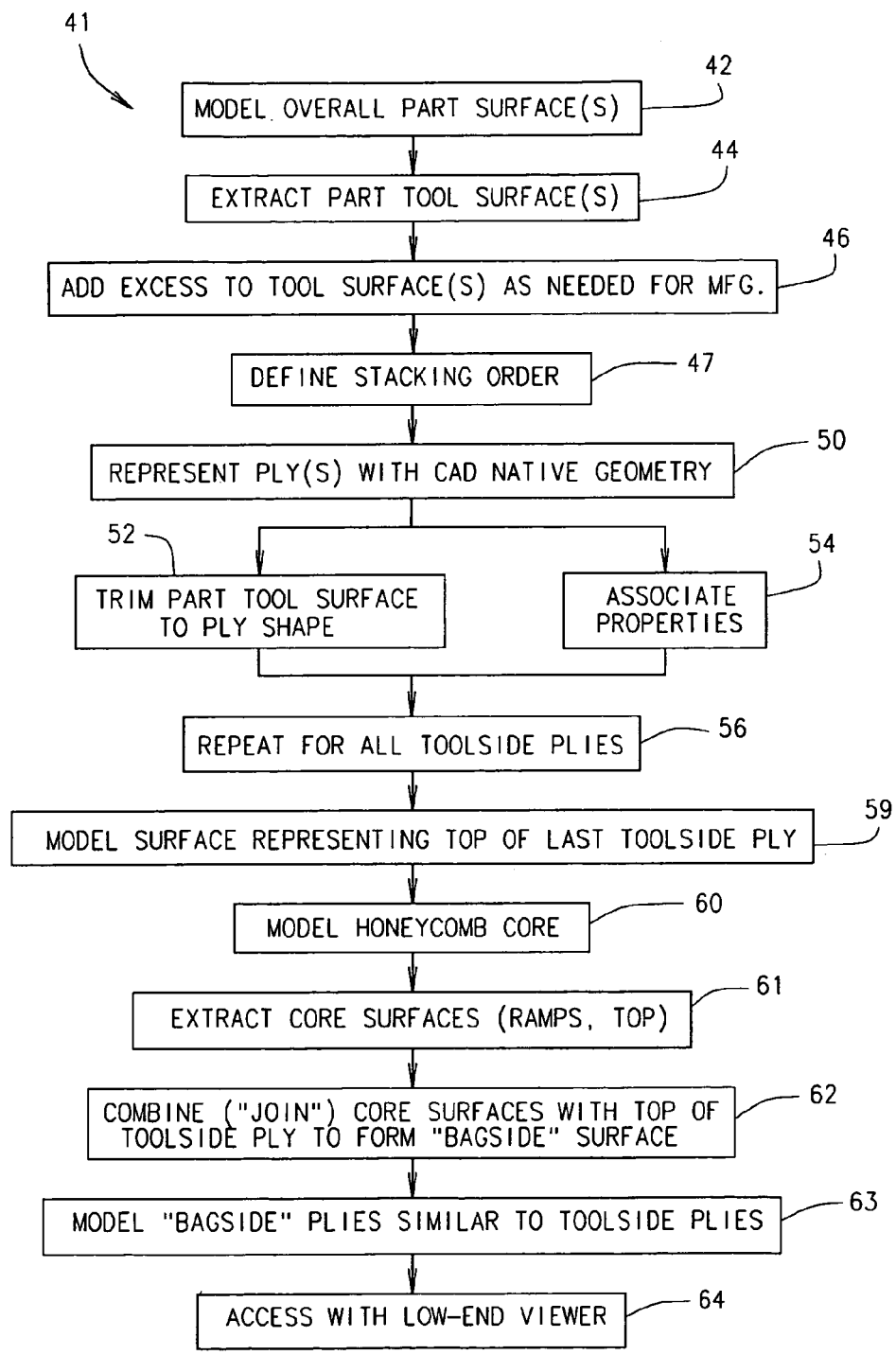
FIG. 2 is a flowchart of a method in accordance with a preferred embodiment of the present invention.

Using the tool surface 69 as a starting point, the designer then represents the tool side laminate as a surface trimmed from the tool surface 69 as shown in operations 50 and 52. If necessary, changes (such as adding a cut out 72) may be made to the trimmed surface 70 to represent the first tool side ply as shown in FIG. 3D. The first toolside ply can describe the laminate ply 70 adajcent to the tool surface 69. Typically, though, the shape of the first bag side ply surface will closely resemble the shape of the tool surface 69 because the tool typically defines the first ply. The term "first bagside ply" generally denotes the laminate layer 74 which is furthest away from the overall part surface 68. However, subsequent ply surfaces 74 will typically change incrementally as more features 76 are modeled ply layer-by-ply layer as illustrated in FIGS. 3E and 3F. Properties may also be associated with the surface to, for example, represent the material or orientation selected for the current ply. Colors, names, and other visualization and interrogation aids may also be added. See operation 54. The designer repeats the operations from operation 50 to 54 for each subsequent bag side ply in operation 56.

With the tool side laminate now completely modeled, the designer creates a surface in operation 59 that represents the top of the final tool side ply. Stiffening elements such as honeycomb core can then be modeled as CAD solid elements upon this surface. See operation 60. The designer can then extract the surfaces of the core that are not common to the "toolside top surface"—these are typically "ramps" and "top" surfaces as in operation 61. Next, in operation 62, the ramp and top surfaces can then be combined with the "toolside top surface" to form a "bagside surface", to enable representation of plies that lay-up over the top of the stiffening (core) element.

The modeling of the bag side reflects operations similar to those in operations 50 through 58, as repeated in operation 63. Once the model 66 is complete, any development team member may then access the detailed design information embodied in the model 66 using a low-end viewer (30 or 36 in FIG. 1) as in operation 64. Moreover, the composite part model 66 may be added to, or created in, a higher-level assembly model at any development location.

Figure 4:
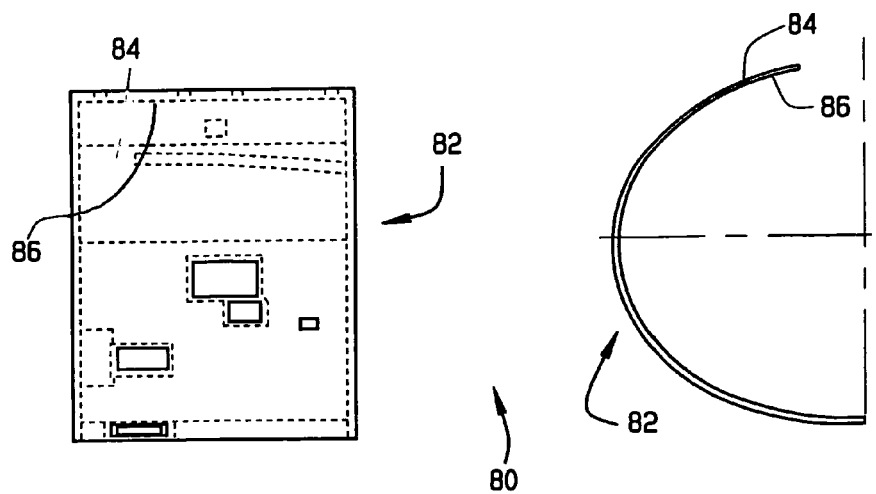
FIG. 4 is a partial view of a drawing of a part modeled in accordance with a preferred embodiment of the present invention.

Having described a method 41 in accordance with the present invention, the data structure of the resulting composite part model 66 may be explored. Turning now to FIG. 4 a pictorial view may be seen of a typical aircraft section design 80, which was used to prove the foregoing composite design method 41. In this example, the section 80 is a Fan Cowl for a Boeing 777 aircraft. The section 80 includes one or more composite parts 82 which lightens and strengthens the section, thereby improving the performance and efficiency of the Boeing 777. For reference purposes, the composite member 82 has a bag side 84 and a tool side 86.

Figure 5:
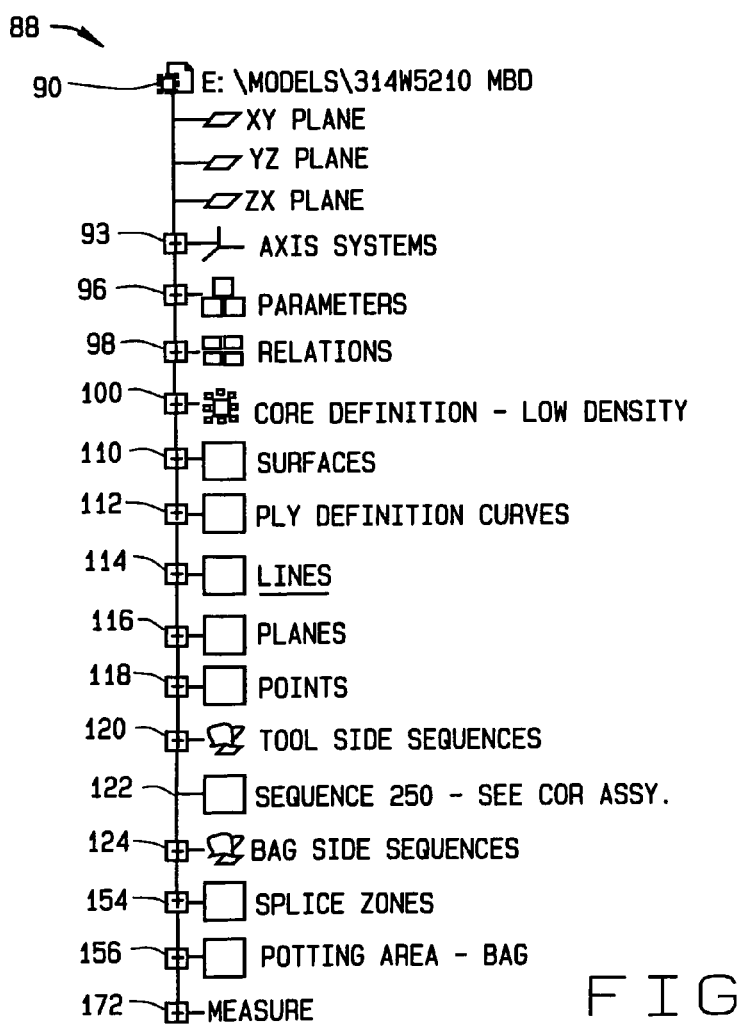
FIG. 5 is the organization of the model of FIG. 4.
Figure 6:
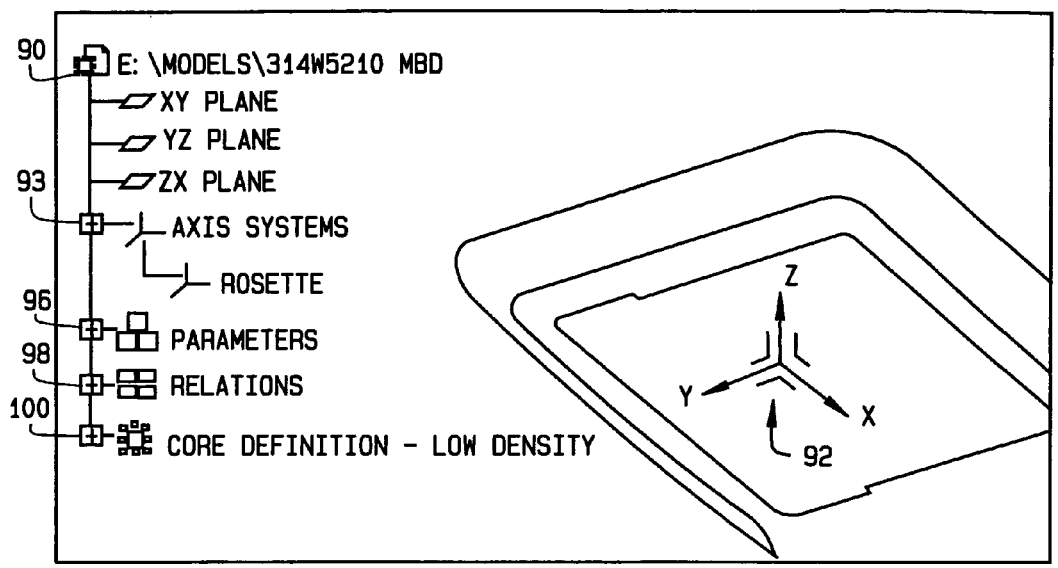
FIG. 6 is a detailed view of FIG. 5.

FIG. 5 shows a specification tree 88 for a model 94 (see FIG. 6 to 12) of the aircraft section 80. At the topmost level, the directory 90, where the CAD application stores the design file is illustrated. As the designer begins to model the section 80 he creates a rosette 92 (see FIG. 6 also) in the axis systems collector 93. The rosette 92 defines the 0 to 90 degree orientation of the plies of the composite parts in the aircraft section 80. In conjunction with the xy, yz, and zx planes, the rosette 92 defines a coordinate space used by the designer to locate the various features of the model 94.

Figure 7:
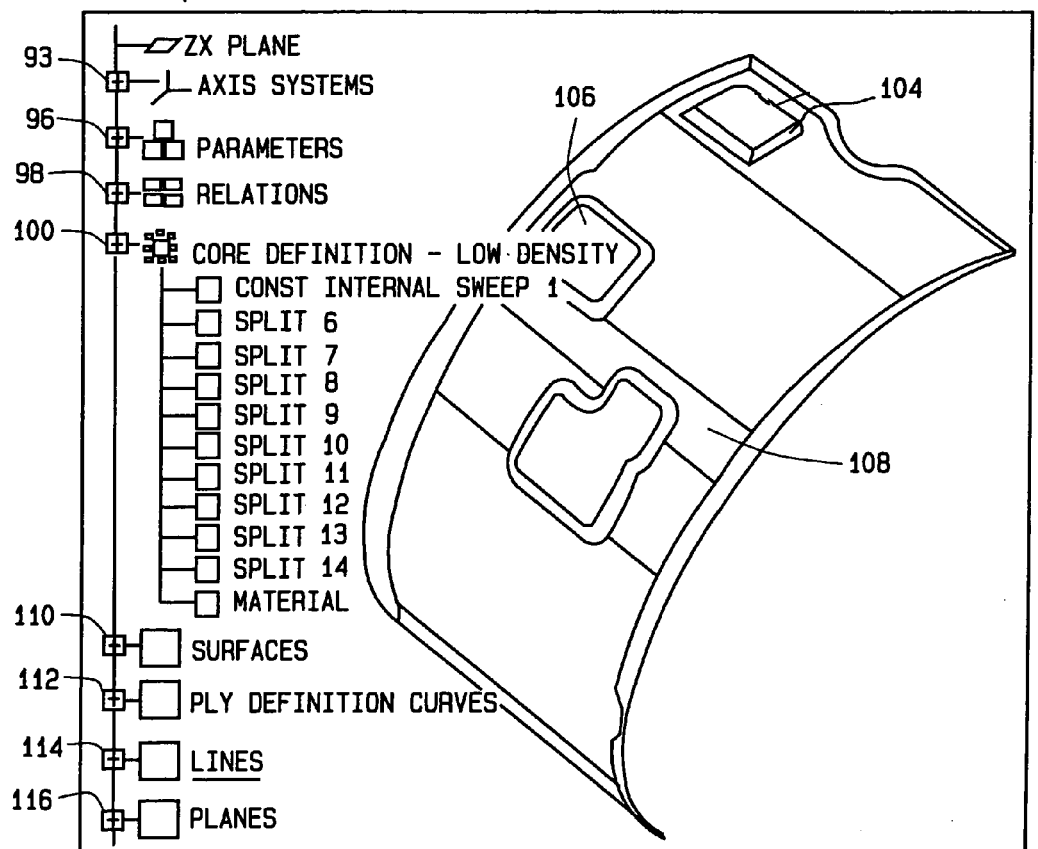
FIG. 7 is a detailed view of FIG. 5.

For purposes of proving the method 41 (FIG. 2), a single stiffening element (core) 100 of the composite part was modeled and filed in the core definition collector. In practice, the core models 102 (as shown in FIG. 7) would contain separate solids for each piece and type of material desired for a given core. Here, the core model 102 includes ramps 104 (20 and 30 degree ramps were both included), cutouts 106, and surface transitions 108. Though, protrusions and other features could have been included without departing from the spirit and scope of the present invention.

While a core model 102 was used to prove the method, the present invention is not restricted to composite designs with core. Rather, any laminate composite may be modeled as taught herein without departing from the spirit or scope of the present invention Once the core model 102 was completed and verified to be a closed body, the core upper surfaces were extracted from the core model 102. Next, they were was joined with the toolside top surface. By duplicating the joined surface and (as desired) modifying the duplicated surface the bag side ply surface was created. Then the bag side ply surface was trimmed and modified in turn to create each bag side ply representation and so forth.

Proceeding down the tree structure 88 of FIG. 5, the lines 114, planes 116, and points 118 collectors contain construction or support geometry open bodies. These collectors pertain to the present invention in that they contain entities used to define the shells representing the plies.

Figure 9:
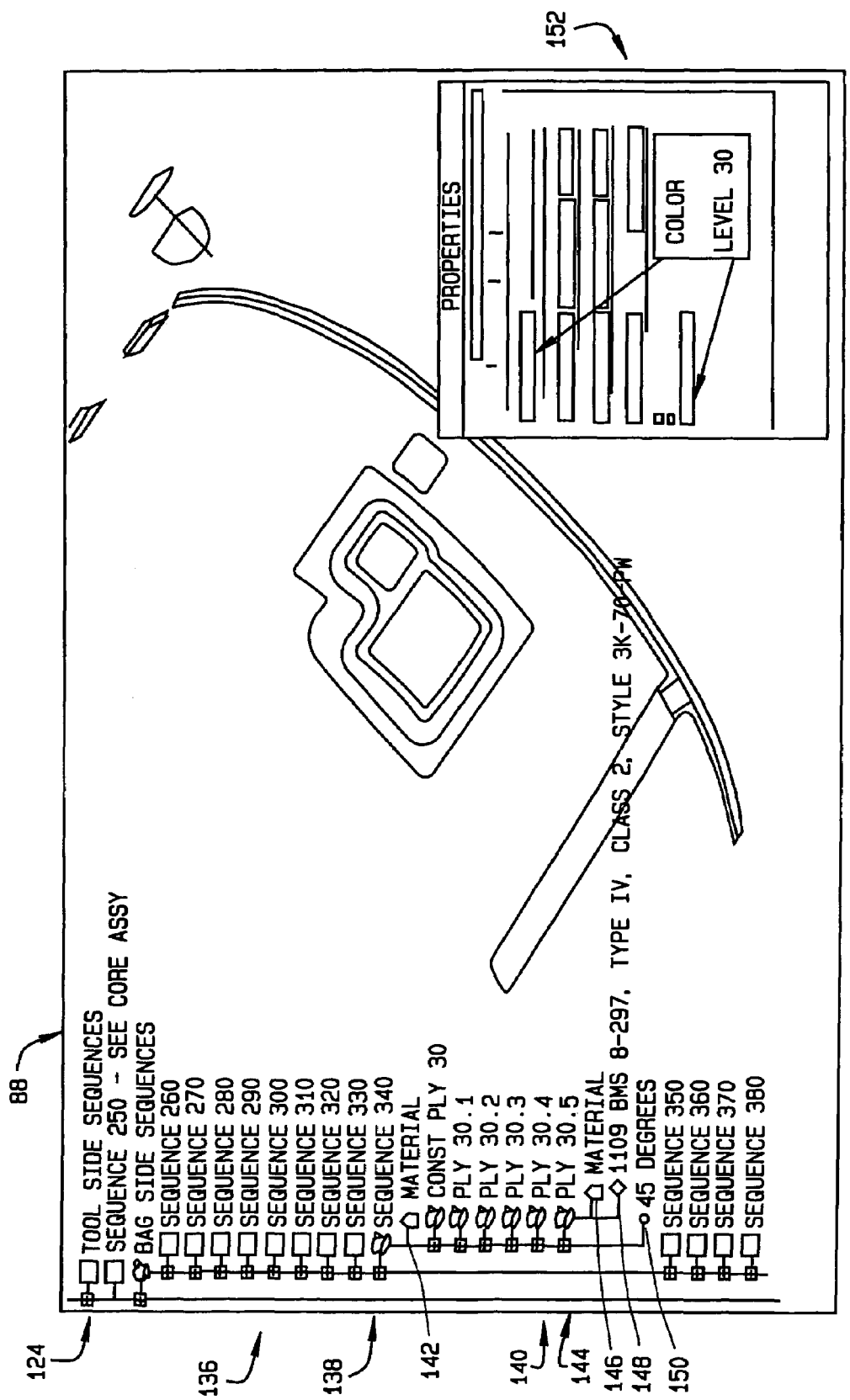
FIG. 9 is a detailed view of FIG. 5.
Figure 10:
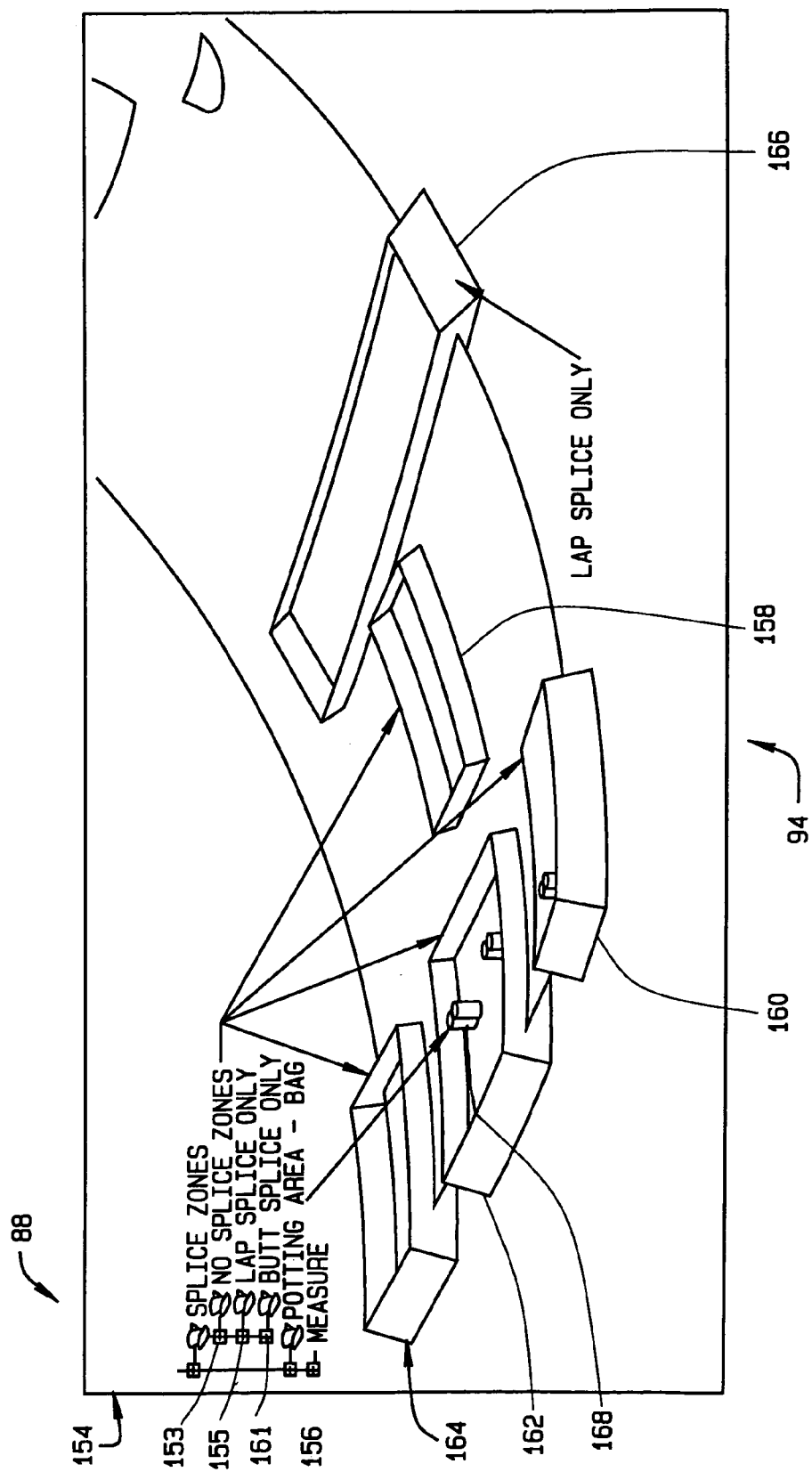
FIG. 10 is a detailed view of FIG. 5.
Figure 11:
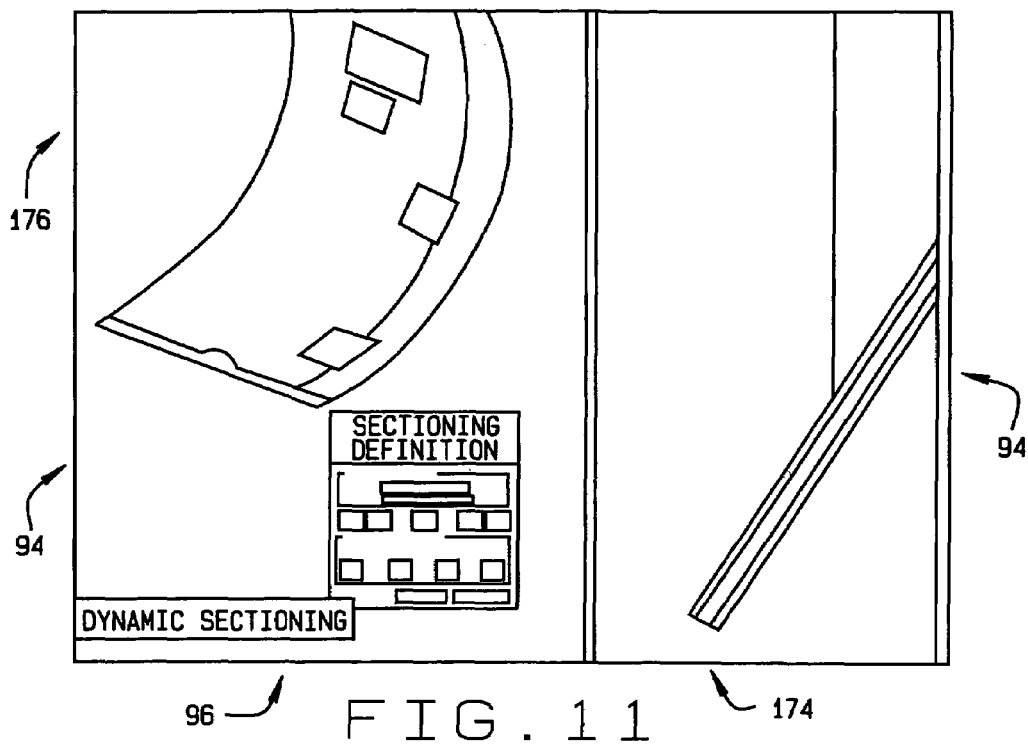
FIG. 11 is a pictorial view of the model of FIG. 4.

Within the tool 120 and bag 124 side sequence collectors of FIGS. 5 and 9, the sequences may be found which represent layers in the laminate and which contain the ply definitions. It will be understood by those skilled in the art that the sequences contain ply definitions, and that each ply definition contains a trimmed surface. Therefore, each sequence and ply definition is a CAD "collector", with the ply geometry being represented by a trimmed surface contained within the ply collector. Again, because the tool side sequence collector 120 resembles the bag side sequence collector 124, only the bag side sequence collector 124 will be discussed in detail with a reference to one also referring to the other.

Figure 8:
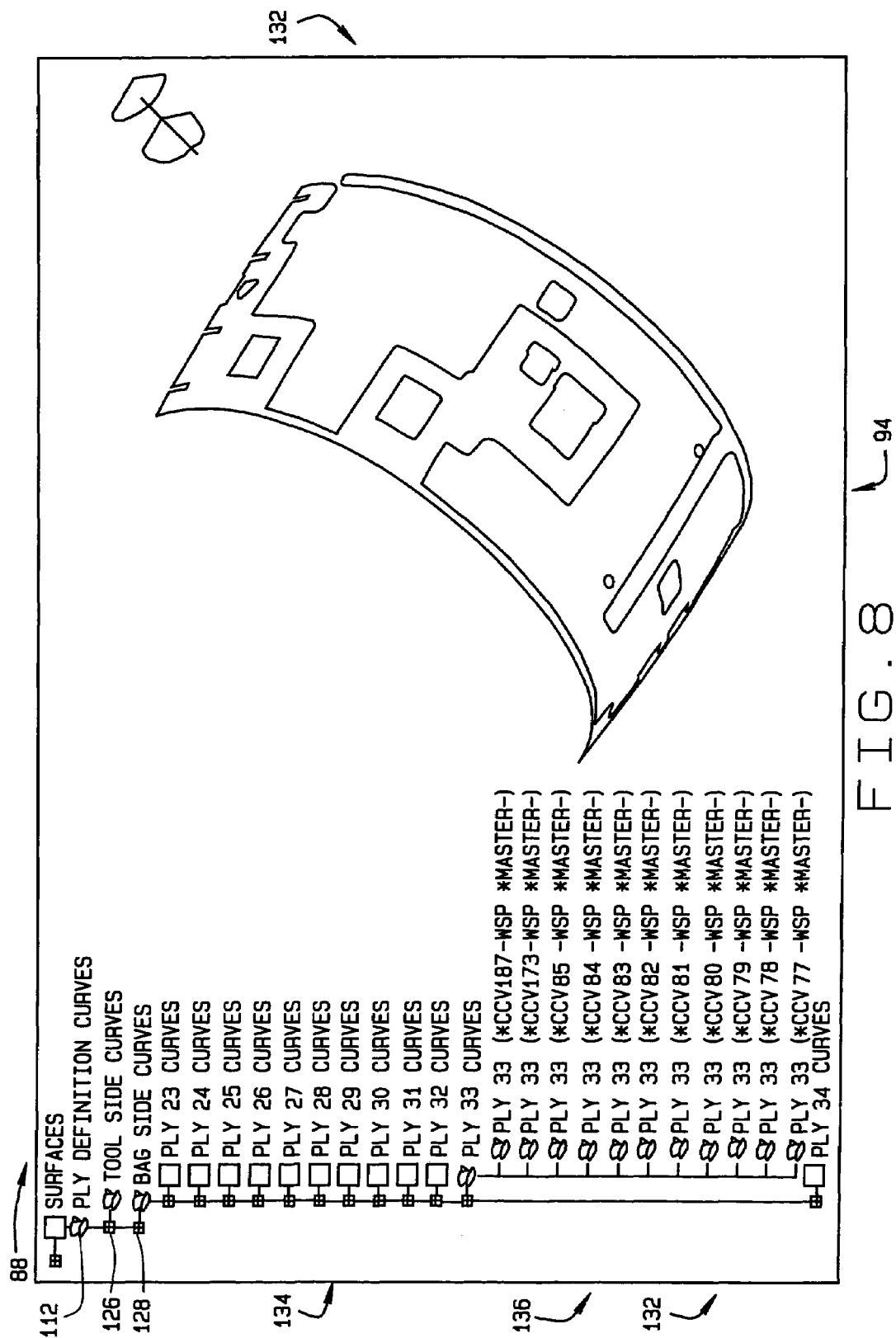
FIG. 8 is a detailed view of FIG. 5.

In FIG. 9 and within the bag side sequence collector 124, the ply surface collectors 136 (and 134 as shown in FIG. 8) are shown. The ply surfaces were created as split surfaces, placed in the appropriate collector and then associated with material and orientation specifications. Note that the ply orientation was modeled by associating a property 150 with the collector 136 which represents the ply. Also, it should be noted that each of the ply surface collectors 136 has a unique name. All plies within a sequence, though, may be assigned the same color (to enhance visualization) and layer properties.

Each of the ply surface collectors 136 also has associated with it and filed in the bag side sequence collector 124 collector design history recording the operations used to create it. These operations may be played back or otherwise accessed to aid development team members in understanding and using the design. Since the subsequent functioning of a model critically depends on how the part was modeled, access to such information is critical to an understanding of the design. Accordingly, the sequences and plys represent critically important design history and intent heretofore unavailable to much of the team.

At this juncture, several aspects of the present invention should be noted. First, the surfaces 134 and 136 representing the plies use only native CAD geometric shapes, namely surfaces. Second, the material associations 142 and 146 may be made using data accessible to non-composite specific licensed viewers (e.g. low-end viewers). Also, design intent such as 148 and 150 is likewise accessible to non-composite specific licensed entities. Additionally, the stacking order of the composite plies may be determined from the order of the sequences containing the plies, as seen in the specification tree, or from the stacking offsets.

Referring back to FIG. 5 for a moment, note that tool 120 and bag 124 side sequence collectors are shown in the tree structure 88 as being separated by the core sequence collector 122. Within the core sequence collector 122, the sequence used to create the solid core model may be found. It is the solid core model from which the surface used to represent the first bag side ply is extracted.

Having now modeled the composite part using only CAD native geometric shapes and associated properties, the full capabilities of the CAD application may be exploited to further develop the composite part. Moreover, low-end viewers may now view detailed design information regarding the composite part. For instance, in FIG. 11, a low-end viewer can access a cross sectional view 174 of the composite part, as well as the perspective view 176 of the composite part.

Figure 12:
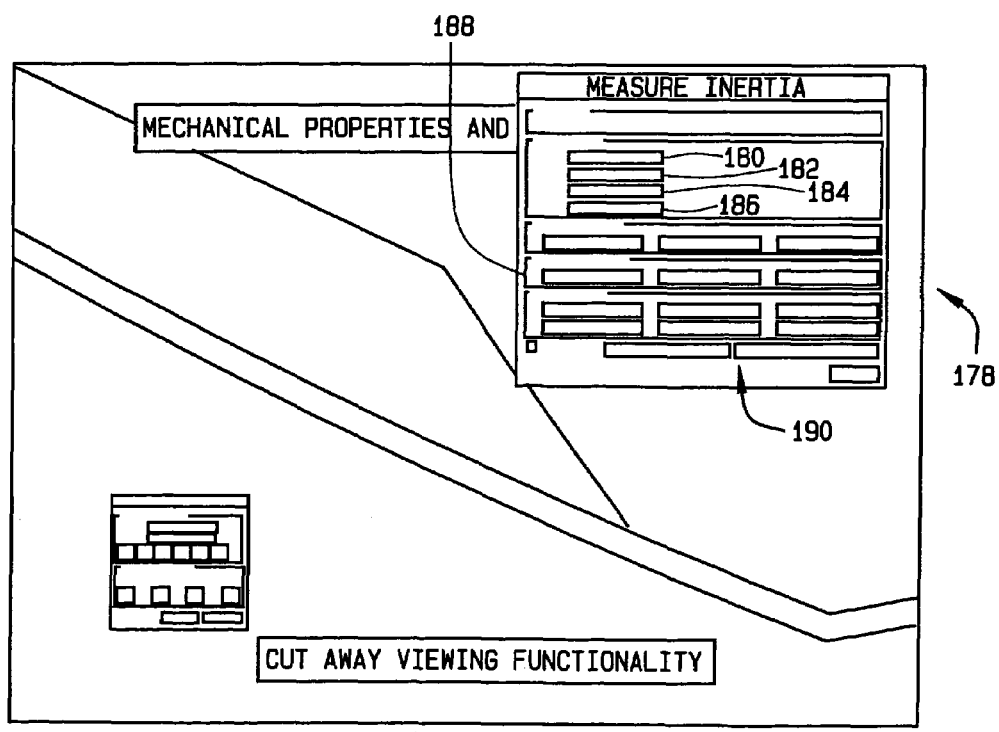
FIG. 12 is a pictorial view of information in the model of FIG. 4.

Likewise, in FIG. 12, a low-end viewer may access other design details of the composite part, which were heretofore unavailable to the low-end viewer. For instance, a display box 178 shows various geometric characteristics of the composite part. The geometric properties include the area 180, volume 182, density 184 (used with the geometric properties to compute other quantities), and mass 186. In addition, the principal moments 188 and inertia matrix 190 may be seen. Likewise, the orientation and material properties of each ply could be accessed by a low-end viewer.

In sharp contrast, previous design processed resulted in a drawing based representation of an encoded 3-D model (or models) similar to that shown in FIG. 13. A key characteristic of this method is that the geometric representation 192 of plies is incomplete and must be supplemented by numerous tables (e.g. 194 and 196), notes 198, layer maps 200, supporting surfaces 202 and numerous 2-D section views 204 in order to attempt a comprehensive definition. Worse still, with previous processes, the wireframe boundaries for the model 192 were on the wrong surface and the textual notes 198 were stored in separate files from the model 192.

In accordance with the principles of the present invention, the Layer map 200 and Ply Table 196 are replaced by a specification tree 88 (see FIG. 5) which organizes all of the composite related data into logical collectors. Textual Flag notes are addressed by CATIA Version 5 Note Object Attributes or parameters embedded in the specification tree 88. Thus, the many advantages of the present invention flow from using trimmed surfaces (versus several wireframe boundaries) related to a parent surface via proprietary construction techniques and formats. The more explicit nature of the surfaces resulting from the present invention allows for easier visualization and utilization of the ply definitions without a dependency on upstream processes.

Thus, the present invention provides a complete three-dimensional model of any composite part. Moreover, the part definition may be viewed by any development team member having either a CAD application license, or, more importantly, a low-end viewer. Furthermore, the team member may be at any development location and still access detailed design information regarding the composite part. In particular, manufacturing personnel may access the model of the composite and modify data to enhance manufacturability of the composite parts.

Accordingly, composite parts developed in accordance with the present design enjoy lower development costs, a higher quality design, more thorough understanding of the part, and superior performance over those designed in accordance with the previous design methods. Also, since the present invention employs only CAD native shapes the associated model may be ported to different CAD application environments thereby improving the flexibility of the development team.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A three-dimensional Computer Aided Design (CAD) model of a composite part to include a plurality of plies including a tool side ply and a subsequent ply and to be formed on a tool having a shape, the model comprising:
    a first CAD native geometric shape representative of the shape of the tool;
    a second CAD native geometric shape representative of the tool side ply, the second CAD native geometric shape comprising a trim of the first CAD native geometric shape; and
    a stacking order determined by a name of a collector for the first trimmed CAD native geometric shape and a name of a collector for a second trimmed CAD native geometric shape.

2. The model of claim 1, further comprising a property associated with the first trimmed CAD native geometric shape.

3. The model of claim 2, the property being representative of a material to be selected for the tool side ply.

4. The model of claim 2, the property being representative of an orientation to be selected for the tool side ply.

5. The model of claim 1, the first trimmed CAD native geometric shape further comprising a surface.

6. The model of claim 1, the first trimmed CAD native geometric shape further comprising a sheet solid.

7. The model of claim 1, further comprising a second trimmed CAD native geometric shape representative of the subsequent ply.

8. The model of claim 7, further comprising an offset by which the second trimmed CAD native geometric shape is offset from the first trimmed CAD native geometric shape.

9. The model of claim 8, further comprising a stacking order defined by the offset.

10. The model of claim 1, further comprising a second trimmed CAD native geometric shape draped on the first trimmed CAD native geometric shape.

11. A method of three dimensional three-dimensional Computer Aided Design (CAD) modeling of a composite part to include a plurality of plies including a tool side ply and a subsequent ply, and to be formed on a tool, the method comprising:
    representing a shape of the tool with a first CAD native geometric shape;
    representing the tool side ply with a second CAD native geometric shape by starting with the first CAD native geometric shape and trimming the first CAD native geometric shape to create the second CAD native geometric shape; and
    locating the tool side ply adjacent the first CAD native geometric shape.

12. The method of claim 11, further comprising associating a property with the second CAD native geometric shape.

13. The method of claim 12, further comprising representing a material to be selected for the tool side ply with the property.

14. The method of claim 12, further comprising representing an orientation to be selected for the tool side ply with the property.

15. The method of claim 12, further comprising:
    representing the subsequent ply with a third CAD native geometric shape; and
    offsetting the third CAD native geometric shape from the first CAD native geometric shape by a distance.

16. The method of claim 15, further comprising draping the third CAD native geometric shape on the second CAD native geometric shape.

17. The method of claim 11, wherein the second CAD native geometric shape is a surface.

18. The method of claim 11, wherein the second CAD native geometric shape is a sheet solid.

19. The method of claim 11, further comprising representing the subsequent ply with a third CAD native geometric shape and locating the third CAD native geometric shape adjacent the second CAD native geometric shape.

20. The method of claim 19, further comprising defining a stacking order with a name of a collector for the second CAD native geometric shape and a name of a collector for the third CAD native geometric shape.

21. The method of claim 11, further comprising:
    accessing a file including the three-dimensional CAD model of the composite part; and
    viewing the model with a low-end viewer.

* * * * *